United States Patent
Kliem

(10) Patent No.: US 11,752,369 B2
(45) Date of Patent: Sep. 12, 2023

(54) MASK SYSTEM FOR CREW MEMBERS OF AN AIRCRAFT

(71) Applicant: Airbus Operations GmbH, Hamburg (DE)

(72) Inventor: Patricia Kliem, Hamburg (DE)

(73) Assignee: Airbus Operations GmbH

( * ) Notice: Subject to any disclaimer, the term of this patent is extended or adjusted under 35 U.S.C. 154(b) by 595 days.

(21) Appl. No.: 16/823,672

(22) Filed: Mar. 19, 2020

(65) Prior Publication Data

US 2020/0306568 A1    Oct. 1, 2020

(30) Foreign Application Priority Data

Mar. 28, 2019  (DE) ...................... 10 2019 107 980.2

(51) Int. Cl.
*A62B 18/02*  (2006.01)
*A62B 18/08*  (2006.01)
*H04R 5/033*  (2006.01)

(52) U.S. Cl.
CPC ............ *A62B 18/02* (2013.01); *A62B 18/082* (2013.01); *B64D 2231/025* (2013.01); *H04R 5/033* (2013.01)

(58) Field of Classification Search
CPC ......... A62B 18/084; A62B 7/00; A62B 18/02; A62B 18/08; A62B 25/00; A62B 7/14;

(Continued)

(56) References Cited

U.S. PATENT DOCUMENTS 2,284,949 A * 6/1942 Cover .................... A62B 23/02
                                                       128/206.13
2,578,007 A * 12/1951 Hill ......................... A41D 13/11
                                                        55/DIG. 35

(Continued)

FOREIGN PATENT DOCUMENTS

CN    204319547 U  *  5/2015
FR    2133181 A5    11/1972

(Continued)

OTHER PUBLICATIONS

English translation for CN 204319547, machine translated by Search Clarivate analytics, translated on Jan. 9, 2022.*

(Continued)

*Primary Examiner* — Tu A Vo
(74) *Attorney, Agent, or Firm* — Lerner David LLP

(57) ABSTRACT

A mask system includes a headphone part having two ear cups and an elastic headband bearing the ear cups, an oxygen mask part having an oxygen mask arranged pivotably on the headband, and a spectacles part having protective spectacles arranged pivotably on the headband. The oxygen mask part can make the oxygen mask, with headband mounted on a head, move into a usage setting and a rest setting. The oxygen mask, in the usage setting, covers a mouth and nose of a user and, in the rest setting, lies at least partially above the headband mounted on a head. The spectacles part can make the protective spectacles, with headband mounted on the head, pivot into a usage setting and a rest setting. The protective spectacles, in the usage setting, cover the eyes of a user and, in the rest setting, lie at least partially above the headband.

12 Claims, 4 Drawing Sheets

(58) Field of Classification Search
CPC ....... A62B 25/005; A62B 18/00; A62B 18/04; A62B 18/082; B64D 11/00; B64D 2231/025; A41D 13/1161; A61M 16/0683; H04R 5/033; A42B 3/22–224
See application file for complete search history.

(56) References Cited

U.S. PATENT DOCUMENTS

| | | | | |
|---|---|---|---|---|
| 2,814,293 | A * | 11/1957 | Gabb | A62B 18/084 128/201.19 |
| 2,928,387 | A * | 3/1960 | Layne | A62B 18/084 128/201.19 |
| 3,167,069 | A * | 1/1965 | Lobelle | B64D 10/00 128/201.24 |
| 4,291,417 | A * | 9/1981 | Pagano | A42B 1/201 2/202 |
| 5,505,197 | A * | 4/1996 | Scholey | A62B 18/00 128/206.17 |
| 5,544,361 | A * | 8/1996 | Fine | A42B 1/0181 2/454 |
| 5,896,590 | A * | 4/1999 | Fleisch | A42B 3/322 224/186 |
| 6,318,369 | B1 * | 11/2001 | Gregory | A62B 18/08 128/857 |
| 11,006,681 | B1 * | 5/2021 | Campos | A41D 13/1184 |
| 2003/0000001 | A1 * | 1/2003 | McDonald | A62B 18/084 2/6.3 |
| 2008/0245364 | A1 * | 10/2008 | Patterson | A62B 7/10 128/201.28 |
| 2011/0308525 | A1 | 12/2011 | Lu et al. | |
| 2020/0215360 | A1 * | 7/2020 | Delprat | A62B 17/04 |
| 2020/0215361 | A1 * | 7/2020 | Delprat | B64D 11/00 |

FOREIGN PATENT DOCUMENTS

| | | | |
|---|---|---|---|
| WO | 2003005765 A2 | 1/2003 | |
| WO | WO-2013082650 A1 * | 6/2013 | ............ A61F 9/02 |
| WO | 2019008446 A1 | 1/2019 | |

OTHER PUBLICATIONS

Search Report including Written Opinion for German Application No. 102019107980.2 dated Jan. 9, 2020; 6 pages (page 2 categorizing the cited references).

French Search Report including Written Opinion for Application No. FR2002747, dated Sep. 14, 2021, 8 pages (page 3 categorizing the cited art).

* cited by examiner

MASK SYSTEM FOR CREW MEMBERS OF AN AIRCRAFT

FIELD OF THE INVENTION

The invention relates to a mask system for crew members of an aircraft and to an aircraft having such a mask system.

BACKGROUND OF THE INVENTION

To protect crew members from hypoxia in the event of a decompression and against smoke or toxic gases, masks which cover the entire face and can be quickly donned are usually used. These are also referred to as "Full Face Quick Donning Masks" (FFQDM). During the flight, such masks are stored at an easily accessible location and, in an emergency, grabbed, put on and used to breathe. They have a face piece which covers the nose and mouth. The mask further has spectacles for protection from smoke. On the face piece is arranged an oxygen regulator, which usually has three different operating modes. In a first operating mode, oxygen, together with ambient air, is conducted to the user. In a second operating mode, pure oxygen is conducted to the user and, in a third mode, oxygen is conducted at an excess pressure to the user. The face piece is further equipped with a microphone.

Due to a certain spectrum of anthropometric boundary conditions, the face piece can in some circumstances not always be placed in precisely fitting manner onto the face of a user. This can result in an oxygen leakage and discomfort in the wearing of the mask. Furthermore, the oxygen regulator can lead to tensions in the neck, since, because of its weight, it pulls the head of the user slightly forwards. Moreover, the field of vision of the user could be restricted by the oxygen regulator. Finally, as a result of the oxygen stream, the speech intelligibility of the user microphone could suffer if the microphone is located close to the oxygen regulator.

BRIEF SUMMARY OF THE INVENTION

An aspect of the invention proposes an alternative oxygen mask which at least reduces, or wholly eliminates, the aforementioned drawbacks. Another aspect of the invention proposes an oxygen mask which can be donned as quickly as possible, does not impair the speech intelligibility of a microphone, is comfortable to use for the user and, in particular, does not induce tensions, yet reliably fulfils the function of the oxygen mask whenever required.

A mask system for crew members of an aircraft is proposed, comprising a headphone part having two ear cups and an elastic headband bearing the ear cups, an oxygen mask part having an oxygen mask arranged movably on the headband, and a spectacles part having protective spectacles arranged movably on the headband, wherein the oxygen mask part is configured to make the oxygen mask, with headband mounted on a head, move into a usage setting and a rest setting, wherein the oxygen mask, in the usage setting, covers the mouth and nose of a user and, in the rest setting, lies at least partially above the headband mounted on a head, and wherein the spectacles part is configured to make the protective spectacles, with headband mounted on the head, move into a usage setting and a rest setting, wherein the protective spectacles, in the usage setting, cover the eyes of a user and, in the rest setting, lie at least partially above the headband mounted on a head.

Within the meaning of the disclosure, the term "movable" can embrace pivotable, tiltable, displaceable, bendable or a combination hereof. The protective spectacles and/or the oxygen mask can consequently be pivotably mounted, or displaced, tilted or bent between different positions, or perform more than one of these movements in combination.

The mask system according to an embodiment of the invention can consequently be construed as a multifunctional oxygen mask with integrated headphone and integrated protective spectacles, wherein the oxygen mask and the protective spectacles are movable into a usage setting and a rest setting, so that they are arranged in front of the face of the user or are remote therefrom. It is therefore advisable to wear the mask system according to an embodiment of the invention permanently in order to make use of the function of a conventional headphone or headset. Only in case of need can the oxygen mask and the protective spectacles be moved very quickly, and immediately after detection of the emergency, into a usage setting in order to make use of their functions. The need to, in an emergency, firstly take off the headphone, to locate the oxygen mask, to grab it and put it on, only then to put the headphone back on, can hence be eliminated. With the solution according to an aspect of the invention, the headband of a headphone practically forms a base which bears the oxygen mask part and the spectacles part. The mask system could consequently also be construed as a headphone, which, in flight, is permanently worn by the pilots and provides an integrated oxygen mask function and spectacles function. Valuable time can hereby be saved.

In addition, the permanent personal usage of the mask system can allow the user to make personal adjustments or adaptations. It can hence be ensured that a comfortable utilization is realized even in an emergency. Moreover, by moving the protective spectacles and the oxygen mask back over the headband, a sensible centre of gravity of the mask system, which lies somewhat above a connecting axis between the ear cups, yet does not shift forwards or rearwards along the direction of view of the user, can be achieved.

Moreover, by mounting the protective spectacles and the oxygen mask movably on the headband, an optimized mutual adaptation of the individual components can be made. The components necessary for the functioning of the oxygen mask part, for instance an oxygen-regulating unit, can be arranged in a weight-balanced manner on the mask system according to the invention, so that there is nothing to prevent a longer use of the oxygen mask part. Moreover, the oxygen mask part can be adapted such that the speech intelligibility at a microphone is not restricted. To this end, outflow paths and an oxygen-regulating unit can be arranged, for instance, at a place on the headband which is as remote as possible from a microphone.

All in all, the mask system according to an embodiment of the invention can provide clear advantages in relation to a conventional oxygen mask. The donning of a separate oxygen mask is not necessary and the oxygen mask part is directly tailored to a headphone or a headset. A better, individual adaptation of an oxygen mask to the appropriate user can be made, and the time from the onset of the emergency to the actual use of the oxygen mask is markedly reduced. Moreover, the relevant licensing requirements CS25.1439 and CS25.1447 of the EASA are met.

Preferably, the oxygen mask part has a lower band and an upper band, between which a web of a flexible material is clamped. The upper band and the lower band can respectively extend fully between the ear cups. All in all, this produces a simplified structure of an oxygen mask, which is then substantially formed by the flexible material. The upper band and the lower band form the limit of the oxygen mask and, if need be, can exert a light tensile force on the material. The bands should be as light as possible and should help to minimize the total weight of the mask system. For instance, they could consist of a light metal and additionally be of hollow configuration or configured with a plurality of recesses. It would also be conceivable to use a soft plastic clinging to the face of the user, for instance silicone or the like. In addition, it is advisable to make the material as soft as possible, so that the oxygen mask is comfortable to wear and adapts to the shape of the face in order to ensure leak-proofness. Preferably it is gas-tight, so that oxygen can no longer escape through the material and no gases can penetrate into the mask from outside. The material preferably has textile properties in order to enable more comfortable wearing. The oxygen mask part can be configured to conduct oxygen from a source into an interspace between the face and the flexible material. By the two bands and the comparatively light, thereby stretched web, a particularly large area can be spanned, which area, even in case of strong mouth movements during speaking, allows reliable covering.

In an advantageous embodiment, an exhalation valve is arranged in the web of the flexible material. The exhalation valve can be provided according to a conventional design and integrated into the flexible material, for instance bonded or welded at the edges in an opening. It could be advantageous to distance the exhalation valve and a feed-in point for the oxygen at least slightly apart. The exhalation valve is provided to release exhaled air from the user to the environment. Air from the interspace between the face and the flexible material can consequently pass through the exhalation valve, through the flexible material, to the outside.

Further advantageously, on one side of the headband could be arranged an oxygen-regulating unit, which could be configured to conduct oxygen from an external source into the oxygen mask. The oxygen-regulating unit can accordingly be provided on one side of the headband, which can be advantageous, in particular, for a weight distribution on the headband. The oxygen-regulating unit could have, for instance, an aneroid, though any optional design of an oxygen-regulating unit is usable upon request. As represented above, it can be advantageous to channel the oxygen into the space between the web of the flexible material and the face of the user. The oxygen-regulating unit can be operated in order to meet licensing-based guidelines in the three operating modes mentioned in the introduction. In the first operating mode, the oxygen is conducted, together with ambient air, to the user. In the second operating mode, solely pure oxygen is conducted to the user and, in a third mode, oxygen is fed at an excess pressure to the user.

Preferably, the headphone part has a microphone, which is arranged on one side of the headband or on one of the ear cups. As a result of the microphone, the conventional communication can be maintained without removal of the mask system.

It is particularly advisable that the oxygen-regulating unit is arranged on a different side of the headband, or one of the ear cups, from the microphone. Consequently, a weight distribution between the oxygen-regulating unit and the microphone is provided, so that an, as far as possible, symmetrical load weighs on the head of the user. Since, moreover, the arrangement is made on the ear cups, it cannot be assumed that the head of the user is subjected to a force which pulls the head forward. A tensioning of the neck can accordingly be countered. As a result of the mutually opposite arrangement of the oxygen-regulating unit and the microphone, a hissing noise of an oxygen line at the microphone can be prevented and the speech intelligibility of the user is improved.

A particularly advantageous embodiment further comprises a latching unit, which is configured to hold the oxygen mask in a plurality of positions detachably on the headband. The latching unit allows the adjustment of a comfortable position of the oxygen mask by the user himself. The latching unit could have, for instance, at least one toothed wheel, which is mounted rigidly on the headband, or is mounted on an ear cup such that it is connected in a rotationally secure manner to the oxygen mask, wherein a resiliently mounted, toothed latching element, connected to the oxygen mask or mounted rigidly on the headband, can engage in the toothed wheel. By a movement of the latching element or a turning of the toothed wheel, the resiliently mounted latching element can jump between successive points of engagement of the teeth. When the latching element and the toothed wheel are engaged, a spring-force-dependent holding force, which counters a movement of the oxygen mask, is achieved. Hence, a perceptible holding force can be very easily exerted on the oxygen mask, which holding force can be released by a user directly by manual intervention.

The upper band can have a bulge for placement onto the bridge of a nose or onto the root of a nose. The design of the upper band, and hence of the oxygen mask, is consequently very ergonomic, and the clinging to the nose can improve the oxygen supply or positively influence the effectiveness of the mask and can ensure leak-tightness against gases.

It is further advantageous if the upper band is flexible. Hence, the oxygen mask can be very well adapted to the individual user and, in particular, to the nose region.

In an advantageous embodiment, the lower band and the upper band could press, by means of at least one resiliently elastic element, in mutually opposing directions. As a result of the resiliently elastic pretensioning, the web of the flexible material is consequently slightly stretched, so that the provided area of the oxygen mask is arranged in front of the face.

Preferably, the protective spectacles are configured to be brought, in their usage setting, into fluidic connection with an oxygen-channelling component of the oxygen mask part. The protective spectacles can consequently, by the discharged oxygen, be flushed with oxygen or with an oxygen-enriched ambient air, so that they remain dry and free of smoke. The oxygen-channelling component could be, for example, an oxygen-regulating unit.

The oxygen mask and the protective spectacles could be arranged over the outside of the headband. Accordingly, the headband can cling firmly to the head and the user is enabled to move the oxygen mask and the protective spectacles over the face with just a single manoeuvre.

The invention further relates to an aircraft, comprising a cockpit having at least one mask system of this kind.

BRIEF DESCRIPTION OF THE DRAWINGS

Further features, advantages and possible applications of the present invention emerge from the following description of the illustrative embodiments and the figures. All described and/or pictorially represented features per se, and in any chosen combination, here form the subject of the invention, also irrespective of their composition in the individual claims or the retroactive applications thereof. In the figures, same reference symbols continue to stand for same or similar objects.

DETAILED DESCRIPTION

Figure 1:
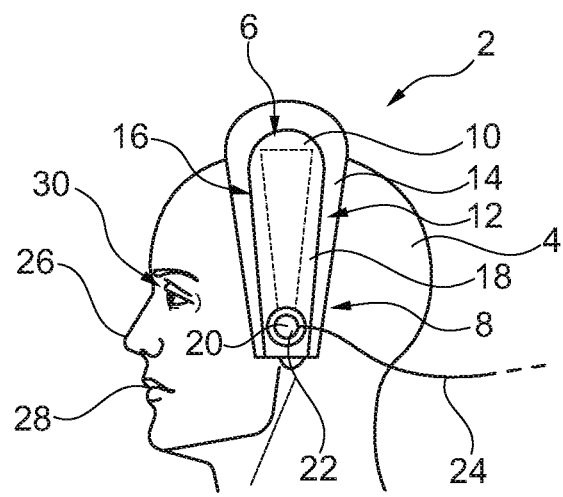
FIGS. 1 to 3 show the mask system in a plurality of schematic representations in different settings.

FIG. 1 shows a mask system 2, which is mounted on a head 4 of a user. A headphone part 6 contained therein has two ear cups 8, which are supported on a headband 10. The headband 10 is elastic and, in an unmounted state, could have a distance between the ear cups 8 which is less than a distance between the ears of the user. When the headphone part 6 is put on, the headband could consequently exert a slight tension on the ears, so that the headband 10 is easily fixed to the head 4.

Furthermore, the mask system 2 has an oxygen mask part 12, which possesses an oxygen mask 14 arranged, by way of example, pivotably on the headband 10. In the represented state, the oxygen mask 14 is in a rest state and here bears flush against the headband 10. In addition, the mask system 2 has a spectacles part 16, which possesses protective spectacles 18 arranged, by way of example, pivotably on the headband 10. The protective spectacles 18 too are here in a rest setting and bear flush against the headband 10.

Both the oxygen mask 14 and the protective spectacles 18 are pivotably mounted about a pivot axis 20, which extends, for instance, through the middle of both ear cups 8. Merely indicated is an oxygen-regulating unit 22, which is connected to an oxygen line 24 and is configured to deliver oxygen, according to requirement, from the oxygen line 24 into the oxygen mask 14.

Figure 2:
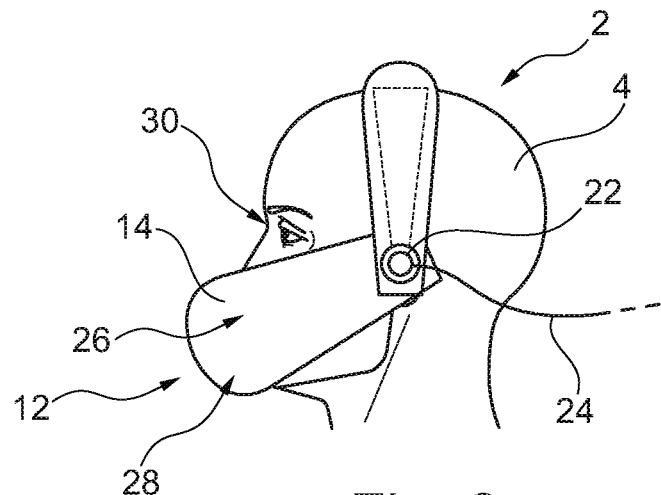

In FIG. 2, the mask system 2 is shown with the oxygen mask 14 in usage setting. Here, the oxygen mask 14 extends over the nose 26 and mouth 28 of the user. The oxygen-regulating unit 22 could optionally be configured to enable, only in this usage setting, a flow of oxygen into the oxygen mask 14. For this, an appropriate barrier or a valve could be provided, for instance, between the oxygen mask 14 and the oxygen-regulating unit 22, which, depending on the momentary position of the oxygen mask 14, establishes or interrupts a fluidic connection to the oxygen-regulating unit 22.

Figure 3:
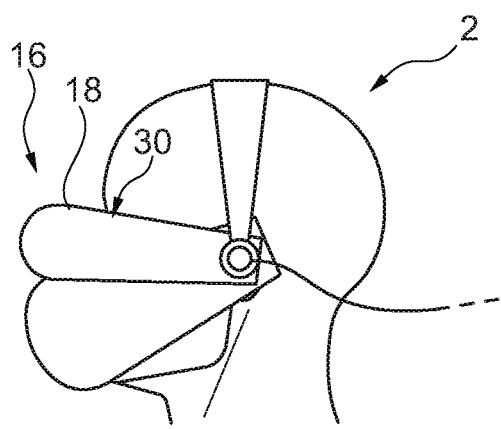

FIG. 3 shows the mask system 2, in which the protective spectacles 18 are pivoted such that they are now in front of the eyes 30 of the user. The eyes can then be protected from smoke.

Figure 4:
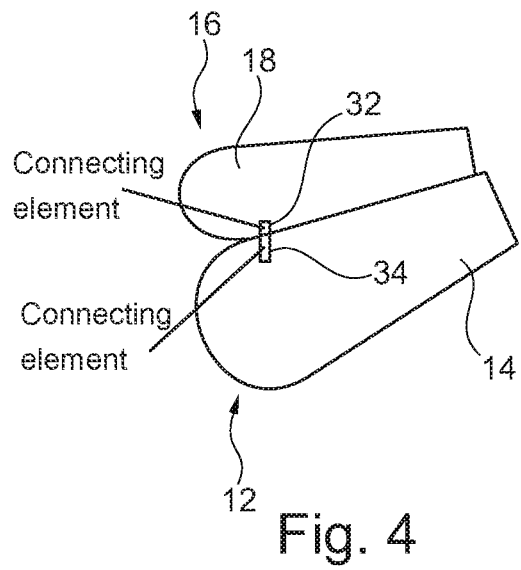
FIG. 4 shows schematically a detail of an oxygen mask part and of a spectacles part.
Figure 5:
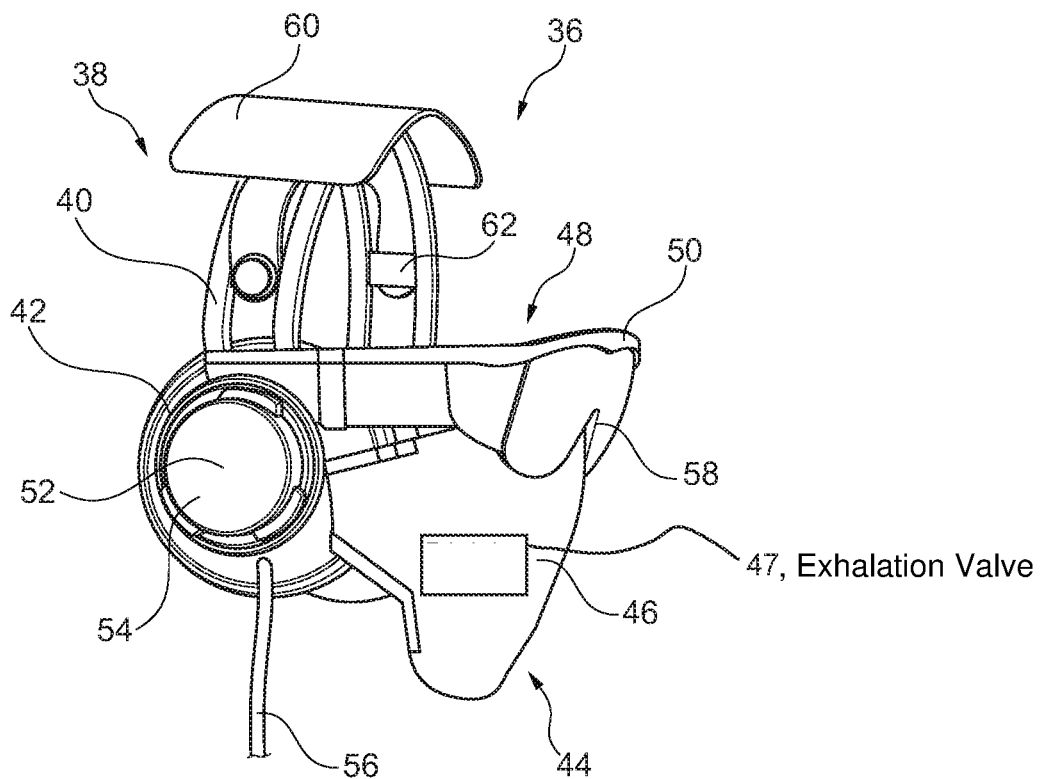
FIGS. 5 to 6 show the mask system in two different three-dimensional representations.

As represented in FIG. 4, the protective spectacles 18 can be equipped with a first connecting element 32, which is connectable to a second connecting element 34 on the oxygen mask 14. The second connecting element 34 can be arranged, in particular, on an upper band (not shown), which, with a lower band (not shown), for the formation of the oxygen mask 12, stretches a web of a flexible material.

By the connecting elements 32 and 34, the positions of the protective spectacles 18 and of the oxygen mask 14 can be fixed relative to one another. The two connecting elements 32 and 34 could be realized in the style of a push button. Alternatively thereto, smooth latching connections or magnetic connections may also be considered. The protective spectacles 18 and the oxygen mask thereby form, in a mounted position, a coherent unit.

By such a connection, between the oxygen mask 14 and the protective spectacles 18 can additionally be achieved a fluidic connection, by which the protective spectacles 18 too are flushed with air or oxygen. However, a fluidic connection can also be established by the oxygen-regulating unit 22.

Whilst the representations in FIGS. 1 to 4 are realized very schematically, FIGS. 5 to 8 show a somewhat more detailed illustrative embodiment. Here a mask system 36, which likewise has a headphone part 38 with a headband 40 and ear cups 42, is shown. An oxygen mask part 44, which possesses an oxygen mask 46 pivotably mounted on the headband 40, is provided. An exhalation valve 47 is arranged in a flexible fabric web 68. In addition, a spectacles part 48, which has protective spectacles 50 likewise pivotably mounted on the headband 40, is provided. The ear cups 42 are in this example broadly circular, whilst a pivot axis 52 runs broadly concentrically to the ear cups 42. On the right ear cup 42 that is shown here is arranged an oxygen-regulating unit 54, which is connected to an oxygen line 56. The protective spectacles 50 have an indentation 58, which is placeable onto the nose 26 of the user.

The spectacles part 48 is configured to, when the protective spectacles 50 are pivoted, open or close an overflow channel in or on the oxygen-regulating unit 54. By pivoting of the protective spectacles 50 into the usage setting, the overflow channel can be opened, so that oxygen or an air-oxygen mixture is conducted also into the protective spectacles 50 in order to keep them dry and free of fog. When they are pivoted back, the overflow channel is reclosed.

In this usage setting, the indentation 58 lies over the oxygen mask 46, which consequently securely encloses the nose 26. The headband 40 has, by way of example, an upper base 60, which is configured to receive the protective spectacles 46 and the oxygen mask 46. Link plates 62 running laterally beneath the base parts 60 can achieve an easily releasable fixing of these two parts 48 and 44.

Figure 6:
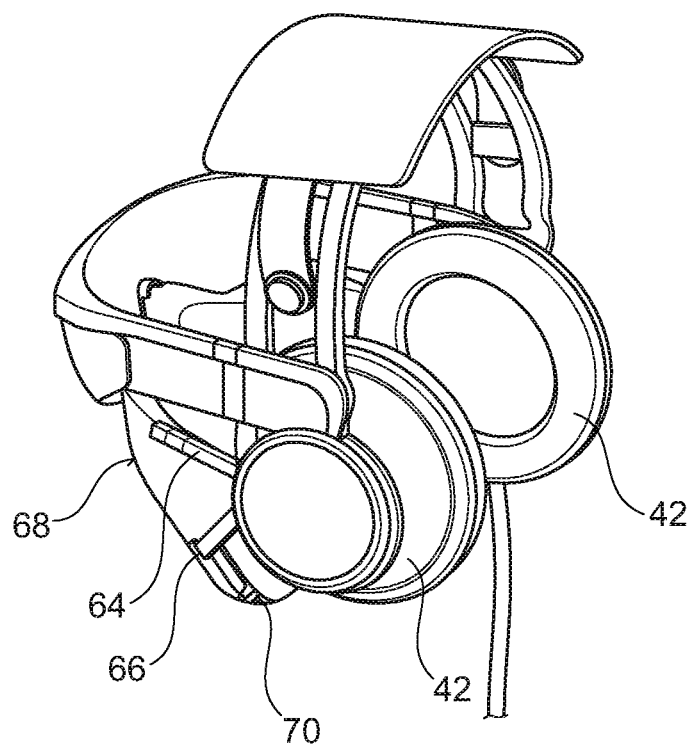

FIG. 6 illustrates the mask system 36 from a different perspective. Here an upper band 64 and a lower band 66, which jointly stretch a flexible fabric web 68 for the formation of the oxygen mask 46, are shown. Both bands 64 and 66 can be rigidly connected to one another and pivotably mounted.

Further indicated is a microphone 70, which is arranged on the ear cup 42 situated opposite to the oxygen-regulating unit 54. Flow-related noises which influence the speech intelligibility of the user can hence be prevented.

Figure 7:
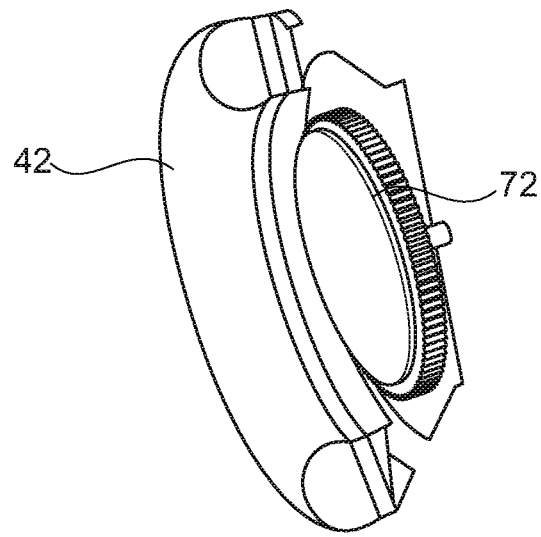
FIG. 7 shows a detail of a latching unit in a partial section.

FIG. 7 shows a partially sectioned view of an ear cup 42 having a toothed wheel 72 which is arranged on the inner side and which, by way of example, is rigidly fastened in the ear cup 42.

Figure 8:
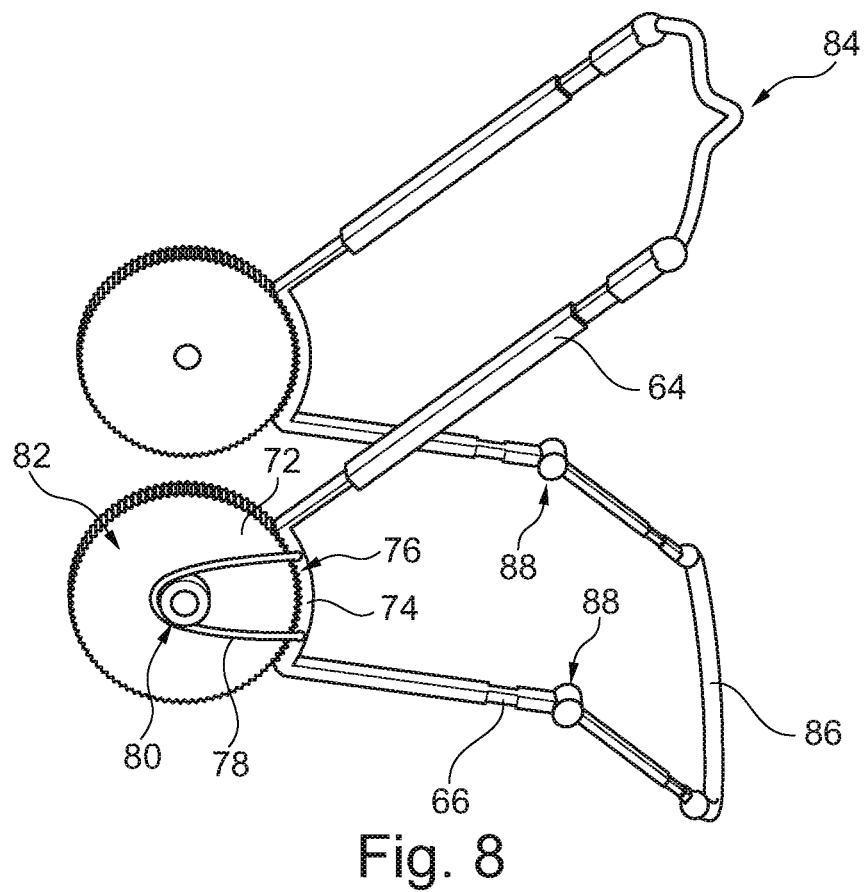
FIG. 8 shows a further detail of a latching unit in a three-dimensional representation.

As represented in FIG. 8, the upper band 64 can be rigidly connected to the lower band 66 via a bridge 74. The bridge 74 and the toothed wheel 72 respectively have a mutually tailored toothing 76. By an elastic traction means 78, which is connected to the bridge 74 and runs in a groove 80 of the toothed wheel 72, the bridge 74 is constantly pressed radially onto the toothed wheel 72. Through the action of the tensile force on the upper band 64 and the lower band 66, the teeth 76 are pressed one into the other. However, when the bands 64 and 66 are moved with a sufficient force which is dependent on the tensile force of the traction means 78 and of the teeth 76, the engagement can be released, so that the teeth can jump between a plurality of engagement positions. By the bridge 74, the toothed wheel 72 and the teeth 76, a manually releasable latching unit 82 is consequently provided.

The upper band 64 has a bulge 84, which is placeable onto the nose 26 of the user. This can be adjoined on the outside by the projection 58 of the protective spectacles 50. The lower band 66 has a connecting bridge 86, which is preferably arranged under the chin of the user. For individual adjustment, the lower band 66 could have hinge joints 88, which allow the lower band 66 to be bent to a certain degree for adjustment to a desired size.

Figure 9:
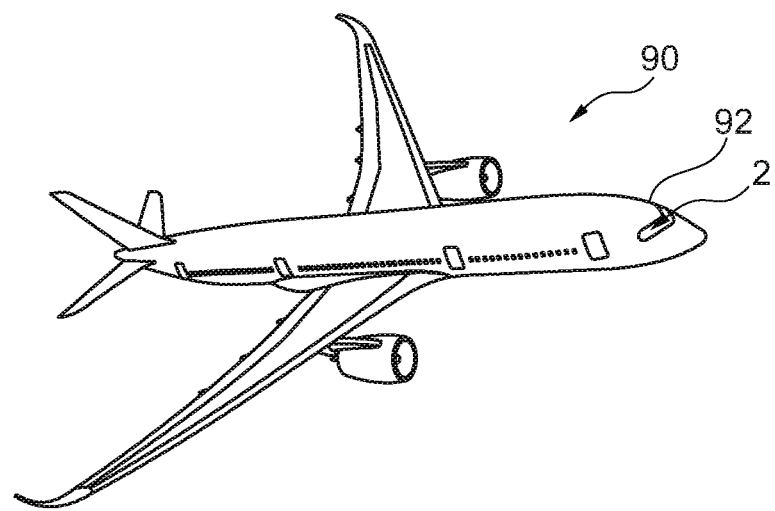
FIG. 9 shows an aircraft.

Finally, FIG. 9 shows an aircraft 90, which possesses a cockpit 92 that could be equipped with such a mask system 2.

By way of addition, it should be pointed out that "comprising" does not preclude any other elements or steps, and "a" does not preclude a multiplicity. It should further be pointed out that features which have been described with reference to one of the above illustrative embodiments can also be used in combination with other features of other above-described illustrative embodiments. Reference symbols in the claims should not be regarded as a restriction.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SYMBOLS 2 mask system
4 head
6 headphone part
8 ear cup
10 headband
12 oxygen mask part
14 oxygen mask
16 spectacles part
18 protective spectacles
20 pivot axis
22 oxygen-regulating unit
24 oxygen line
26 nose
28 mouth
30 eye
32 first connecting element
34 second connecting element
36 mask system
38 headphone part
40 headband
42 ear cup
44 oxygen mask part
46 oxygen mask
48 spectacles part
50 protective spectacles
52 pivot axis
54 oxygen-regulating unit
56 oxygen line
58 indentation
60 upper base
62 link plate
64 upper band
66 lower band
68 fabric web
70 microphone
72 toothed wheel
74 bridge
76 toothing
78 traction means
80 groove
82 latching unit
84 bulge
86 connecting bridge
88 hinge joint
90 aircraft
92 cockpit

The invention claimed is:

1. A mask system for crew members of an aircraft, comprising:
a headphone part comprising two ear cups and an elastic headband bearing the ear cups;
a toothed wheel arranged on an inner side of and rigidly fastened in one of the two ear cups;
an oxygen mask part comprising an oxygen mask arranged pivotably on the headband; and
a spectacles part having protective spectacles arranged pivotably on the headband,
wherein the oxygen mask part is configured to make the oxygen mask, with headband mounted on a head, move into a usage setting and a rest setting, wherein the oxygen mask, in the usage setting, covers a mouth and nose of a user and, in the rest setting, lies at least partially above the headband mounted on a head, and
wherein the spectacles part is configured to make the protective spectacles, with headband mounted on the head, pivot into a usage setting and a rest setting, wherein the protective spectacles, in the usage setting, cover the eyes of a user and, in the rest setting, lie at least partially above the headband mounted on a head,
wherein the oxygen mask part comprises a lower band and an upper band, and a web of a flexible material is clamped and stretched between the lower band and the upper band, wherein the upper band is rigidly connected to the lower band via a bridge, the bridge and the toothed wheel having a mutually tailored toothing.

2. The mask system according to claim 1, further comprising an exhalation valve arranged in the web of the flexible material.

3. The mask system according to claim 1, wherein the oxygen mask part comprises an oxygen-regulating unit, arranged on one side of the headband and configured to conduct oxygen from an external source into the oxygen mask.

4. The mask system according to claim 1, wherein the headphone part comprises a microphone, arranged on one side of the headband or one of the two ear cups.

5. The mask system according to claim 4, wherein the oxygen mask part comprises an oxygen-regulating unit, arranged on one side of the headband and configured to conduct oxygen from an external source into the oxygen mask, and wherein the oxygen-regulating unit is arranged on a different side of the headband, or one of the two ear cups, from the microphone.

6. The mask system according to claim 1, further comprising a latching unit, configured to hold the oxygen mask in a plurality of pivot positions detachably on the headband.

7. The mask system according to claim 1, wherein the upper band comprises a bulge for placement onto a bridge of a nose or onto a root of a nose.

8. The mask system according to claim 1, wherein the upper band is flexible.

9. The mask system according to claim 1, wherein the lower band and the upper band are configured to be pressed by at least one resiliently elastic element in mutually opposing directions.

10. The mask system according to claim 1, wherein the protective spectacles are configured to be brought, in their usage setting, into fluidic connection with an oxygen-channelling component of the oxygen mask part.

11. The mask system according to claim 1, wherein the oxygen mask and the protective spectacles are arranged over the outside of the headband.

12. An aircraft, comprising a cockpit having at least one of the mask system according to claim 1.

* * * * *